United States Patent
Klemm et al.

(10) Patent No.: US 10,308,840 B2
(45) Date of Patent: Jun. 4, 2019

(54) TRANSPARENT ADHESIVE WITH A REFRACTIVE INDEX RANGING FROM 1.7 TO 1.73

(71) Applicant: CeramTec-ETEC GmbH, Lohmar (DE)

(72) Inventors: Elisabeth Klemm, Weimar (DE); Martin Tittel, Bad Berka (DE)

(73) Assignee: CeramTec-ETEC GmbH, Lohmar (DE)

( * ) Notice: Subject to any disclaimer, the term of this patent is extended or adjusted under 35 U.S.C. 154(b) by 485 days.

(21) Appl. No.: 14/906,790

(22) PCT Filed: Jul. 22, 2014

(86) PCT No.: PCT/EP2014/065737
§ 371 (c)(1),
(2) Date: Jan. 21, 2016

(87) PCT Pub. No.: WO2015/011147
PCT Pub. Date: Jan. 29, 2015

(65) Prior Publication Data
US 2016/0160084 A1    Jun. 9, 2016

(30) Foreign Application Priority Data

Jul. 22, 2013 (DE) .................. 10 2013 214 272
Dec. 4, 2013 (DE) .................. 10 2013 224 907

(51) Int. Cl.
| | | |
|---|---|---|
| *C09J 4/00* | (2006.01) | |
| *C08F 220/38* | (2006.01) | |
| *C09J 9/00* | (2006.01) | |
| *C09J 11/04* | (2006.01) | |
| *C08F 222/10* | (2006.01) | |
| *C08K 3/22* | (2006.01) | |

(52) U.S. Cl.
CPC .............. *C09J 4/00* (2013.01); *C08F 220/38* (2013.01); *C09J 9/00* (2013.01); *C09J 11/04* (2013.01); *C08F 2222/1013* (2013.01); *C08K 3/22* (2013.01); *C08K 2003/2296* (2013.01)

(58) Field of Classification Search
CPC ....... C09J 4/00; C09J 9/00; C09J 11/04; C09J 133/14
USPC ...... 522/38, 180, 153; 524/853; 428/355 AC
See application file for complete search history.

(56) References Cited

U.S. PATENT DOCUMENTS

| | | |
|---|---|---|
| 4,606,864 A | 8/1986 | Warren |
| 4,654,431 A | 3/1987 | Deboer |
| 5,741,831 A | 4/1998 | Keita et al. |
| 8,258,232 B2 | 9/2012 | Husemann et al. |
| 2006/0205835 A1 | 9/2006 | Husemann et al. |
| 2010/0261018 A1* | 10/2010 | Turshani ............ C08F 2/50 428/414 |

FOREIGN PATENT DOCUMENTS

| | | |
|---|---|---|
| DE | 10 2011 014 100 A1 | 9/2012 |
| JP | 2004-269814 A | 9/2004 |
| RU | 2005122900 A | 8/2006 |
| WO | 01/42382 A2 | 6/2001 |

* cited by examiner

*Primary Examiner* — Fred M Teskin
(74) *Attorney, Agent, or Firm* — Norton Rose Fulbright US LLP; James R. Crawford

(57) ABSTRACT

A transparent adhesive having a refractive index ranging from 1.7 to 1.73 and to the production and the use thereof, particularly the use thereof for coatings and adhesive bonds.

18 Claims, No Drawings

TRANSPARENT ADHESIVE WITH A REFRACTIVE INDEX RANGING FROM 1.7 TO 1.73

This application is a § 371 of International Application No. PCT/EP2014/065737 filed Jul. 22, 2014, and claims priority from German Patent Application Nos. 10 2013 214 272.2 filed Jul. 22, 2013 and 10 2013 224 907.1 filed Dec. 4, 2013.

FIELD OF THE INVENTION

The present invention relates to a transparent adhesive having a refractive index ranging from 1.7 to 1.73 and to the production and the use thereof, particularly the use thereof for coatings and adhesive bonds.

BACKGROUND OF THE INVENTION

From DE 10 2011 014 100 A1, a transparent protective system is known, which comprises at least one component composed of a monocrystal or composed of a polycrystalline ceramic and has an RIT>10%, wherein, particularly advantageously, the monocrystals or the ceramic does not necessarily have to be polished, and therefore the production costs resulting from such a polishing operation are eliminated.

Ideally, according to DE 10 2011 014 100 A1, a grinding operation to be performed before the polishing also can be omitted and the at least one component composed of ceramic or monocrystal can, in use immediately after the production of said component, be combined with a matrix material. If the matrix material has at least approximately the same refractive index or the same refractive index as the at least one component, every optical flaw of the surface of the at least one component is advantageously compensated, and therefore, for example, poor polishing quality can be accepted, or the at least one component does not have to be ground and polished.

SUMMARY OF THE INVENTION

According to the invention, the transparent adhesive is one that has a refractive index ranging from 1.7 to 1.73 and that is based on thioacrylate of general formula 1

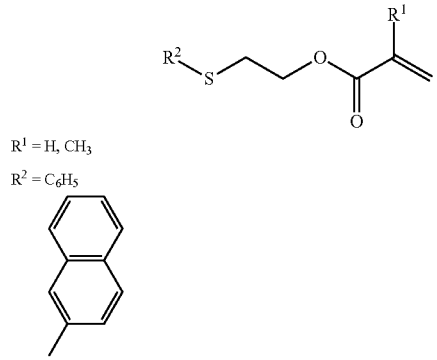

$R^1 = H, CH_3$
$R^2 = C_6H_5$ and on a polymerization initiator.

DETAILED DESCRIPTION

The adhesive preferably contains pentabromophenyl methacrylate of general formula 2

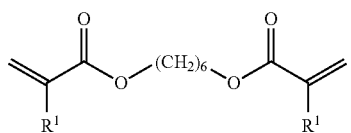

as a comonomer in an amount of 0 to 20 wt %.

The adhesive also preferably contains bisacrylates of general formula 3

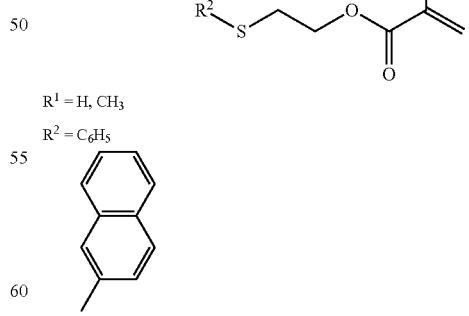

as cross-linking agents in an amount of 0 to 5.0 wt %.

The adhesive preferably contains a photoinitiator as a polymerization initiator in an amount of 2.0 to 5.0 wt %, preferably 2.0 to 3.0 wt %. The photoinitiator is preferably selected from the group comprising hydroxy ketones, monoacylphosphines, bisacylphosphines, and/or benzoyl derivatives. 1-hydroxycyclohexyl phenyl ketone, 2,4,6-trimethylbenzoyl bisphenyl phosphine oxide, bis(2,4,6-trimethylbenzoyl)phosphine oxide, or 2-hydroxy-2-methyl-1-phenyl-propanone is highly preferably contained as a photoinitiator in the adhesive according to the invention.

The adhesive also contains inorganic nanoparticles selected from the group comprising metal oxides in an amount of 0 to 12 wt %, preferably oxides of the elements aluminum, zinc, or titanium, and the adhesive according to the invention especially preferably contains zinc oxide in an amount of 0 to 12 wt %. Within the meaning of this application, particles having a particle size of 1 to 150 nm, determined by dynamic light scattering (DLS) by means of laser beam diffraction as per DIN ISO standard 13320-1, are understood by nanoparticles.

The method according to the invention for producing a transparent adhesive occurs in such a way that a thioacrylate of general formula 1

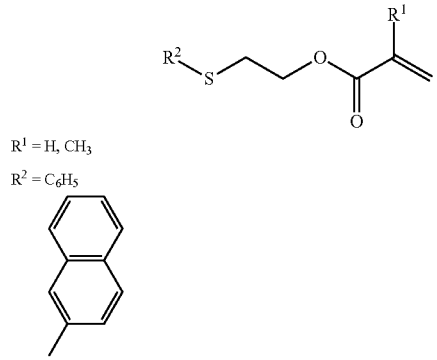

$R^1 = H, CH_3$
$R^2 = C_6H_5$ and a polymerization initiator are mixed and cured. Preferably, the photoinitiator is added in an amount of 2.0 to 5.0 wt %, preferably 2.0 to 3.0 wt %. The photoinitiator is selected from the group comprising hydroxy ketones, monoacylphosphines, bisacylphosphines, and/or benzoyl derivatives. 1-hydroxycyclohexyl phenyl ketone, 2,4,6-trimethylbenzoyl bisphenyl phosphine oxide, bis(2,4,6-trimethylbenzoyl)phosphine oxide, or 2-hydroxy-2-methyl-1-phenyl-propanone is highly preferably contained as a photoinitiator in the adhesive according to the invention. The curing occurs preferably by actinic radiation, especially preferably by irradiation by means a UVA lamp at a radiation intensity between 10 mW/cm² and 40 mW/cm².

Preferably, pentabromophenyl methacrylate of general formula 2

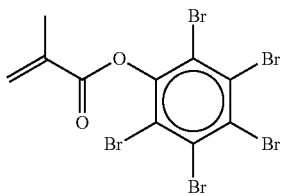

is added in an amount of 0 to 20 wt % and/or a bisacrylate of general formula 3

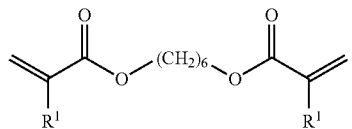

is added in an amount of 0 to 5 wt % in the method according to the invention.

Advantageously, inorganic nanoparticles selected from the group comprising metal oxides of the elements aluminum, zinc, or titanium and especially preferably zinc oxide are also added to the adhesive mass in an amount of 0 to 12 wt %. The inorganic nanoparticles are preferably added to the adhesive mass as a dispersion in ethanol and/or isopropanol in the method according to the invention.

Surprisingly, it was found that, by embedding ceramics or monocrystals, which can be unpolished or possibly not only unpolished but also unground, in a matrix material, which is composed of the adhesive according to the invention and the refractive index of which corresponds to the refractive index of the ceramic or of the monocrystal at least approximately, i.e., within a range of ±10%, a transparent protective system can be realized that also enables a complex geometry of the protective system in an economical manner.

The adhesive provided according to the present invention is now especially suitable for being used as a matrix material in the sense of DE 10 2011 014 100 A1. By means of said adhesive, it is surprisingly possible to set an optical refractive index $n_B$ that can be varied within wide ranges. The preferred adhesive according to the invention has an optical refractive index $n_B$ of >1.7.

As a result of the use of the adhesive according to the invention with an optical refractive index that is adapted to the optical refractive index of the at least one component as desired, the optical boundaries to the at least one component composed of polycrystalline ceramic material or of monocrystal disappear. Thus, only the adhesive according to the invention itself is the boundary to the environment, at which boundary reflection and/or refraction can occur. In combination, for example, with glass panes or other panes, only the outermost layer is then still relevant in a corresponding composite.

In an especially advantageous manner, the adhesive according to the invention can be used to produce transparent ballistics protective systems, blasting-wear-resistant viewing windows for blasting cabinets, windows for machining installations (scratch-resistant and high-strength), transparent architectural elements, transparent parts in the jewelry field, such as dial glasses in wristwatches, chemical windows having high resistance to acids and lyes, and/or windows for measurement sensors.

The invention is explained in more detail below on the basis of examples, without the scope of protection being thereby restricted only to the subject matter presented as examples.

EXAMPLE 1

In a reaction vessel, 20 g of pentabromophenyl methacrylate are dissolved in 200 ml of acetic ester while stirring is performed, under the exclusion of moisture. Then, while constant stirring is performed, 80 g of 2-naphthalene-thio-ethyl-acrylate and 2.0 g of 2-hydroxy-2-methyl-1-phenyl-propan-1-one are added as initiators. The slightly viscous solution has a light brown color and is usable for adhesive bonds and coatings.

EXAMPLE 2

In a reaction vessel, 10.0 g of an ethanolic nano zinc oxide dispersion, 40 wt % in ethanol, ≤130 nm particle size determined by dynamic light scattering (DLS), density=1.2-1.3 g/cm³, are added to the solution produced according to example 1, under the exclusion of moisture. Thorough stirring is performed for some time and a brown stable dispersion is obtained. After the solvent mixture has been removed, the adhesive is usable.
Viscosity: 350 mPas The curing occurs by means of a UVA lamp having a radiation intensity of at least 10 mW/cm². The irradiation time depends on the thickness of the glass/ceramic parts to be joined and is generally 5 minutes. A transparent colorless adhesive-bonding joint is obtained. The joined parts exhibit high environmental stability and are also stable in a warm, humid alternating climate.

The joined parts are firmly connected without change up to 170° C.
n=1.72 (633 nm)
Shear strength: 6.4 N/mm²

EXAMPLE 3

In a reaction vessel, 100 g of 2-naphthalene-thio-ethyl-acrylate are homogenously mixed with 2.0 g of 2-hydroxy-2-methyl-1-phenyl-propan-1-one while stirring is performed, under the exclusion of moisture. The slightly yellow solution is usable for coatings or as an adhesive.

EXAMPLE 4

In a reaction vessel, 15.0 g of an ethanolic nano zinc oxide dispersion, Sigma Aldrich, 40 wt % in ethanol, ≤130 nm particle size determined by DLS, density=1.2-1.3 g/cm³, are added to the adhesive solution produced according to example 3, under the exclusion of moisture. Thorough stirring is performed for some time and a light brown stable dispersion is obtained. After the solvent mixture has been removed, the adhesive is usable.

Viscosity: 300 mPas

The curing occurs by means of a UVA lamp having a radiation intensity of at least 10 mW/cm$^2$. The irradiation time depends on the thickness of the glass/ceramic parts to be joined and is generally 5 minutes. A transparent colorless adhesive-bonding joint is obtained. The joined parts exhibit high environmental stability and are also stable in a warm, humid alternating climate.

The joined parts are firmly connected without change up to 170° C.

n=1.72 (633 nm)

Shear strength: 11.8 N/mm$^2$

The invention claimed is:

1. An adhesive having a refractive index ranging from 1.7 to 1.73 based on thioacrylate of formula 1

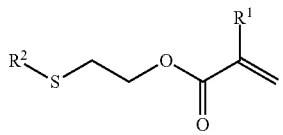

$R^1$ = H, CH$_3$ $R^2$ =

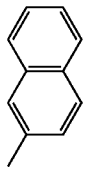

and a polymerization initiator, wherein the adhesive is transparent.

2. The adhesive according to claim 1, wherein the adhesive further comprises a commoner, wherein the comonomer is pentabromophenyl methacrylate of formula 2

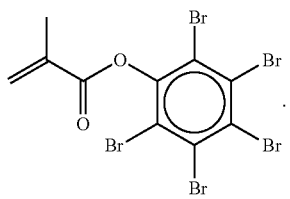

3. The adhesive according to claim 1, further comprising a cross-linking agent, wherein the crosslinking agent is a bisacrylate of formula 3

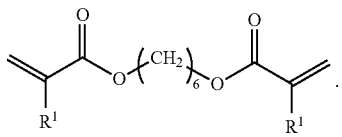

4. The adhesive according to claim 1, wherein the adhesive contains the polymerization initiator as a photoinitiator and is present in an amount of 2.0 to 5.0 wt %.

5. The adhesive according to claim 4, wherein the photoinitiator is selected from the group consisting of a hydroxy ketone, a monoacylphosphine, a bisacylphosphine and a benzoyl derivative.

6. The adhesive according to claim 4, wherein the photoinitiator is selected from the group consisting of 1-hydroxycyclohexyl phenyl ketone, 2,4,6-trimethylbenzoyl bisphenyl phosphine oxide, bis(2,4,6-trimethylbenzoyl) phosphine oxide and 2-hydroxy-2-methyl-1-phenyl-propanone.

7. The adhesive according to claim 1, further comprising inorganic nanoparticles, wherein the inorganic nanoparticles comprise a metal oxide.

8. The adhesive according to claim 7, wherein the metal oxide is selected from the group consisting of an aluminum oxide, a zinc oxide and a titanium oxide.

9. The adhesive according to claim 8, wherein the metal oxide is zinc oxide.

10. A method for producing the adhesive according to claim 1, comprising the steps of:
    mixing the thioacrylate of formula 1 with the polymerization initiator to form a mixture; and curing the mixture.

11. The method according to claim 10, wherein inorganic nanoparticles are added to the mixture, wherein the inorganic nanoparticles comprise a metal oxide.

12. The method according to claim 11, wherein the inorganic nanoparticles are added as a dispersion in at least one member selected from the group consisting of ethanol and isopropanol.

13. A coated substrate comprising a substrate and a coating comprising the adhesive of claim 1.

14. An article of manufacture comprising the adhesive of claim 1 joining two surfaces.

15. An article of manufacture comprising an adhesive, wherein the adhesive has a refractive index ranging from 1.7 to 1.73 based on thioacrylate of formula 1

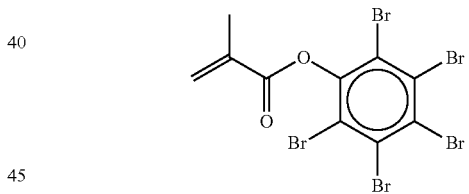

and a polymerization initiator, wherein the adhesive is transparent, wherein the article of manufacture is a transparent ballistics protective system, a blasting-wear-resistant viewing windows for a blasting cabinet, a window for a machining installation that is scratch-resistant, a transparent architectural element, a transparent jewelry part, a chemical window having resistance to acids and lyes or a window for a measurement sensor.

16. An article of manufacture comprising the adhesive of claim 1,
    wherein the article of manufacture is a transparent ballistics protective system, a blasting-wear-resistant viewing windows for a blasting cabinet, a window for a machining installation that is scratch-resistant, a transparent architectural element, a transparent jewelry part, or a window for a measurement sensor.

17. An article of manufacture comprising an adhesive, wherein the adhesive has a refractive index from 1.7 to 1.73 based on thioacrylate of formula 1

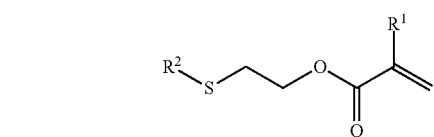

R¹ = H, CH₃

R² = C₆H₅

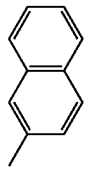

and a polymerization initiator, wherein the adhesive is transparent, wherein the article of manufacture is a transparent ballistics protective system, a blasting-wear-resistant viewing windows for a blasting cabinet, a window for a machining installation that is scratch-resistant, a transparent architectural element, a transparent jewelry part, or a window for a measurement sensor.

18. An adhesive having a refractive index of 1.7 based on thioacrylate of formula 1

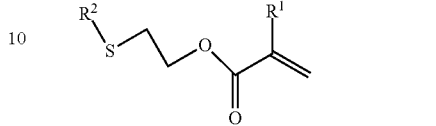

R¹ = H, CH₃

R² = 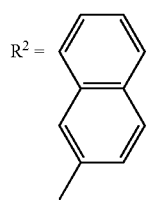

and a polymerization initiator, wherein the adhesive is transparent.

* * * * *